United States Patent [19]
Christensen et al.

[11] Patent Number: 5,561,666
[45] Date of Patent: Oct. 1, 1996

[54] APPARATUS AND METHOD FOR DETERMINING OPERATIONAL MODE FOR A STATION ENTERING A NETWORK

[75] Inventors: Kenneth J. Christensen, Apex; Jack S. Chorpenning, Cary; Michael S. Siegel, Raleigh; Thomas E. Stammely, Cary; Norman C. Strole, Raleigh; Kenneth T. Wilson; Raymond L. Zeisz, Jr., both of Raleigh, all of N.C.

[73] Assignee: International Business Machines Corporation, Armonk, N.Y.

[21] Appl. No.: 399,267

[22] Filed: Mar. 6, 1995

[51] Int. Cl.⁶ .................................. H04L 5/14; H04B 1/56
[52] U.S. Cl. .................................. 370/24; 270/31; 270/56
[58] Field of Search .................................. 370/24, 31, 85.4, 370/85.5, 85.12, 85.13, 85.14, 85.15, 60, 60.1, 94.1, 56; 375/222

[56] References Cited

U.S. PATENT DOCUMENTS

| | | | |
|---|---|---|---|
| 5,121,382 | 6/1992 | Yang et al. | 370/31 |
| 5,155,726 | 10/1992 | Spinney et al. | 370/31 |
| 5,311,114 | 5/1994 | Sambamurthy et al. | 370/31 |
| 5,349,635 | 9/1994 | Scott | 370/31 |
| 5,404,351 | 4/1995 | Inoue | 370/31 |
| 5,432,775 | 7/1995 | Crayford | 370/31 |

Primary Examiner—Benedict V. Safourek
Assistant Examiner—Ajit Patel
Attorney, Agent, or Firm—Joscelyn G. Cockburn

[57] ABSTRACT

A station in a communications network determines the mode (full-duplex or half-duplex) in which it communicates with a concentrator port by establishing a Registration routine between the station and the concentrator port. The station and concentrator port exchange frames which disclose the capabilities of the concentrator port. If the concentrator port has duplex capabilities, the station enters as a duplex station. Otherwise, the station enters in a half-duplex (token ring) mode.

42 Claims, 9 Drawing Sheets

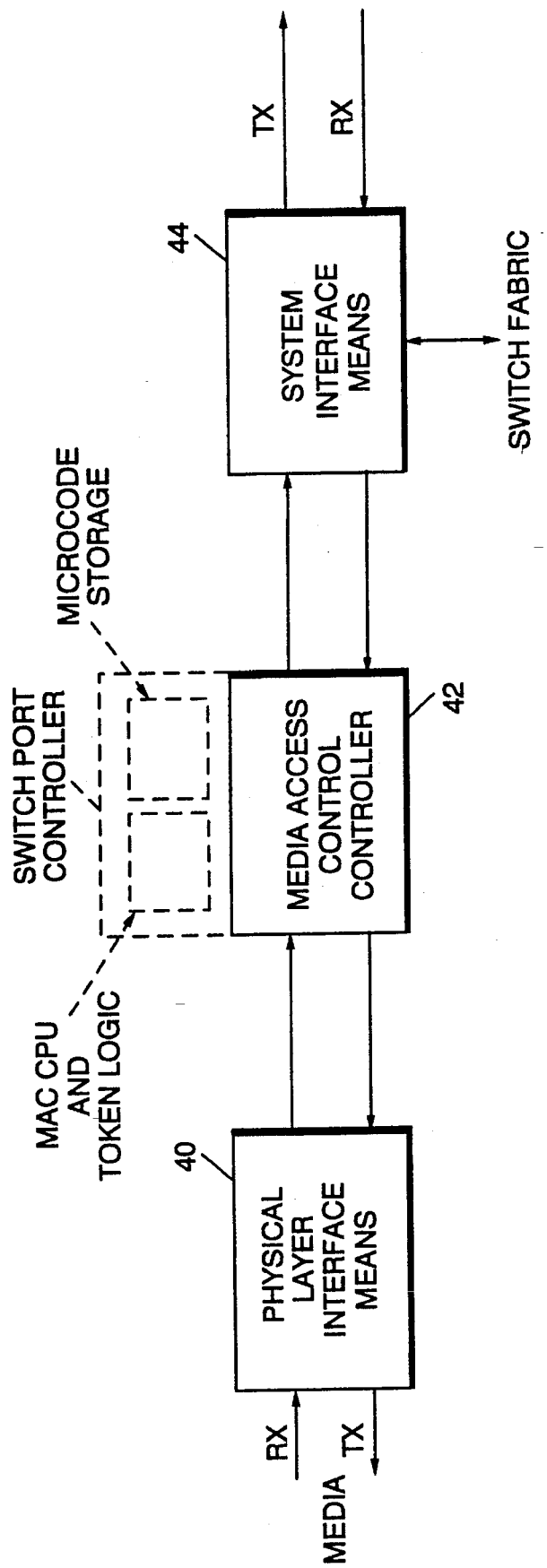

APPARATUS AND METHOD FOR DETERMINING OPERATIONAL MODE FOR A STATION ENTERING A NETWORK

BACKGROUND OF THE INVENTION

1. Field of the Invention

The present invention relates to Local Area Networks (LANs) in general and, in particular, to improved concentrators and stations for use in said LANs.

2. Prior Art

The use of switches for interconnecting LAN segments are well known in the prior art. A LAN segment may be defined as a group of stations connected to a common media. By interconnecting LAN segments through a switch, simultaneous communication between groups of stations are made possible and, as a consequence, the bandwidth capabilities of the interconnected LANs are increased.

U.S. Pat. No. 5,274,631 describes a switching system for interconnecting ethernet LAN segments. The switching system consists of a multiplex switching logic module to which a plurality of packet processors are connected. Each packet processor is associated with a port to which an ethernet LAN segment is connected. The packet processor routes frames through the switch, from a station on one LAN to another station on another LAN.

There has been a steady demand for more bandwidth in such systems. The demand, in part, is based upon growth in the number of network stations and the increase processing power of such stations allowing them to use the growing number of data intensive applications such as multimedia applications.

Another phenomenon pushing the need for increased bandwidth is the trend to centralize server functions. One could envision a network in which one server services several different LAN segments. A straightforward way of providing the high bandwidth required to enable such a server to serve multiple LAN segments would be to use a full-duplex link and devices for coupling the server and the LAN segments. The use of true full-duplex links in non-LAN communications networks are well known. However, there are several problems to overcome in adapting full-duplex to LAN systems.

U.S. Pat. No. 5,155,726 describes a technique for establishing and maintaining full-duplex between two stations on a token ring network. Each station enters the ring operating in a token (half-duplex) mode. Each station then ascertains if only one other active station is operating on the token ring network and, if so, exchanges frames with the other station to establish full-duplex communication.

Even though the patent is a step in the right direction, it has certain drawbacks. The duplex operation is between two stations on a token ring LAN segment. Each station must enter the ring in half-duplex (token) mode of operation and then switch to full-duplex if network conditions warrant the switch. This calls for an expensive station adapter since both token (half-duplex) MAC and full-duplex MAC must be implemented. In addition, the patent cannot be used with a switch.

SUMMARY OF THE INVENTION

It is, therefore, the main object of the present invention to provide full-duplex communication between a station and a port of a switching concentrator.

It is another object of the present invention to provide a full-duplex station which is able to determine if the port to which it is connected supports full-duplex operation and, if so, begin communications in a full-duplex mode.

It is also another object of the present invention to provide a station which operates in the half-duplex (token) mode if test carried out between the station and the port to which the station is attached indicates the port is a half-duplex port. A station can determine that it is not connected to a port, but instead to a shared bandwidth concentrator, and insert.

The above objects and others are achieved by defining a new protocol to be practiced between a station and a switch port to which the station is connected. If the outcome indicates the switch port is a duplex port, the station enters and operates in the full-duplex mode. Otherwise, the station could enter and operate in a half-duplex (token) mode.

In particular, a station wishing to enter the network generates and transmits to the port of the concentrator (switch) to which the station is connected, a Media Access Control (MAC) frame called "Registration Request". This is a new management frame with new sub-vector fields indicating the requested protocol (full-duplex or half-duplex).

The sub-vectors indicate to the port that the sending station wishes to operate in full-duplex mode. A port recognizing the Registration Request will respond with a positive registration response if the port can support full-duplex operation. Otherwise, the port will respond with a negative Registration Response MAC frame.

The station then waits for the Registration Response MAC frame. If no Registration Response MAC frame is received, the station will retry the request up to N times. If no Registration Response MAC frame is received, the station will not join the network if it can only operate in the full-duplex mode. If it can also operate in half-duplex (token) mode, it joins the network operation in the half-duplex mode.

In another feature of the invention, Insertion Request and Response MAC frames are exchanged between the switch port and the station before transmission of data frames begins.

DESCRIPTION OF THE DRAWINGS

These and other objects, features and advantages will be more fully appreciated with reference to the accompanying figures.

FIG. 6 shows a functional block diagram of the switch port full-duplex protocol generator.

DESCRIPTION OF THE PREFERRED EMBODIMENT

Figure 1:
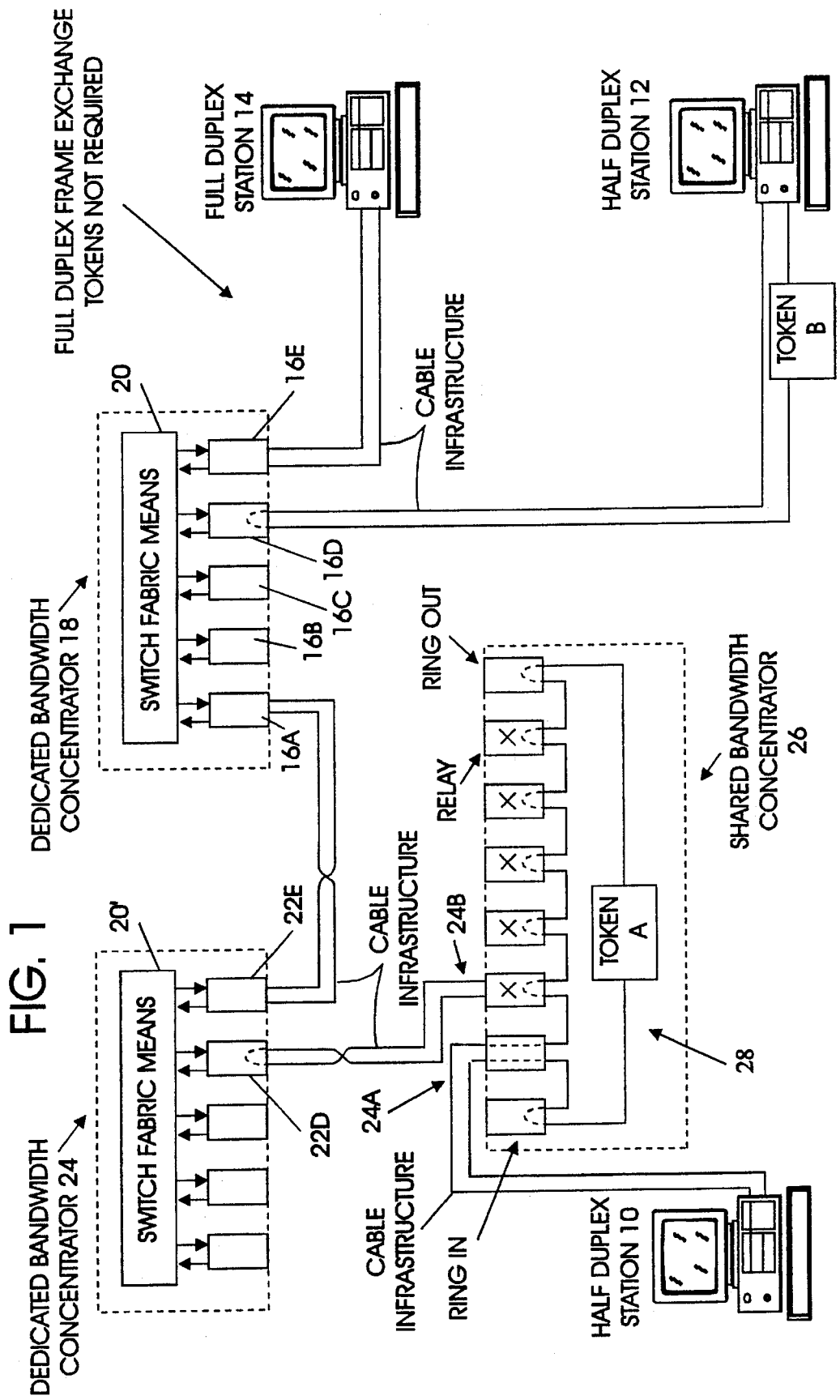
FIG. 1 shows a network configuration embodying the teachings of the present invention.

FIG. 1 shows a mixed Local Area Network (LAN) configuration of half-duplex token ring stations such as 10 and 12 and full-duplex station 14. Hereinafter in this specification, half-duplex is abbreviated to TKP. Likewise, full-duplex is abbreviated as TXI meaning TRANSMIT IMMEDIATE. These abbreviations are consistent with the terms used in the proposed IEEE 802.5 standard supplement 802.5R for token ring. The half-duplex station 12 is connected over cable infrastructure to port means 16D of a dedicated bandwidth concentrator 18. The dedicated bandwidth concentrator 18 (details of which will be given later) includes a switch fabric means 20 which is coupled through dedicated transmission media to each of the port means 16A–16E. Another one of the port means 16A is coupled by cable infrastructure to port means 22E of dedicated bandwidth concentrator 24. Another port 22D of the dedicated bandwidth concentrator 24 is connected by cable infrastructure to port 24B of a shared bandwidth concentrator 26. Another port 24A of shared bandwidth concentrator 26 is coupled by cable infrastructure to half-duplex station 10. The cable infrastructure could be a prewired infrastructure used for operating half-duplex stations or full-duplex stations. The shared bandwidth concentrator 26 could be a conventional concentrator such as the IBM 8228 Concentrator which allows a plurality of stations, only one of which is shown as half-duplex station 10 to be interconnected. The concentrator may also be interconnected through a cable to other concentrators (via ring in and ring out) and/or to a dedicated bandwidth concentrator 24 and the Token Ring LAN 28.

Still referring to FIG. 1, in a normal token ring operation (hereinafter defined as half-duplex operation) a station shares its bandwidth with other stations using token passing protocols such as the IEEE 802.5 standard for token ring. In full-duplex operation, all token protocols are suspended and simultaneous transmit and receive of flames is possible when the station is attached to the compatible full-duplex concentrator or switch port such as 16E. For half-duplex operation, a circulating token is required and shown pictorially in FIG. 1 as Token A on LAN 28. In the dedicated bandwidth concentrator 18 and 24, the token is provided by the port means. Therefore, the port means 16D of the dedicated bandwidth concentrator 18 provides the circulating token to the half-duplex station 12. The token path being generated in the port means 16D is shown by the broken curved line in port means 16D. Similarly, the broken curved line in port means 22D indicates the token is provided by the port means 22D. In operation, token B is generated in port means 16D and circulates between port means 16D and the half-duplex station 12. Similarly, token A circulates between port means 22D of the dedicated bandwidth concentrator 24, between each port of the shared bandwidth concentrator 26, and the half-duplex station 10. Of course, other half-duplex stations (not shown) could be connected to other ports of the shared bandwidth concentrator 26. The token path in the shared bandwidth concentrator 26 is shown by broken lines. For full-duplex operation bidirectional communication between the full-duplex station 14 and full-duplex port means 16E a token is not required. Prior to this invention, the mixed LAN of FIG. 1 was not possible. However, by providing the present invention (details to be given subsequently) the mixed configuration LAN of FIG. 1 is made possible. In addition, stations on the network can operate at different speeds.

Figure 2:
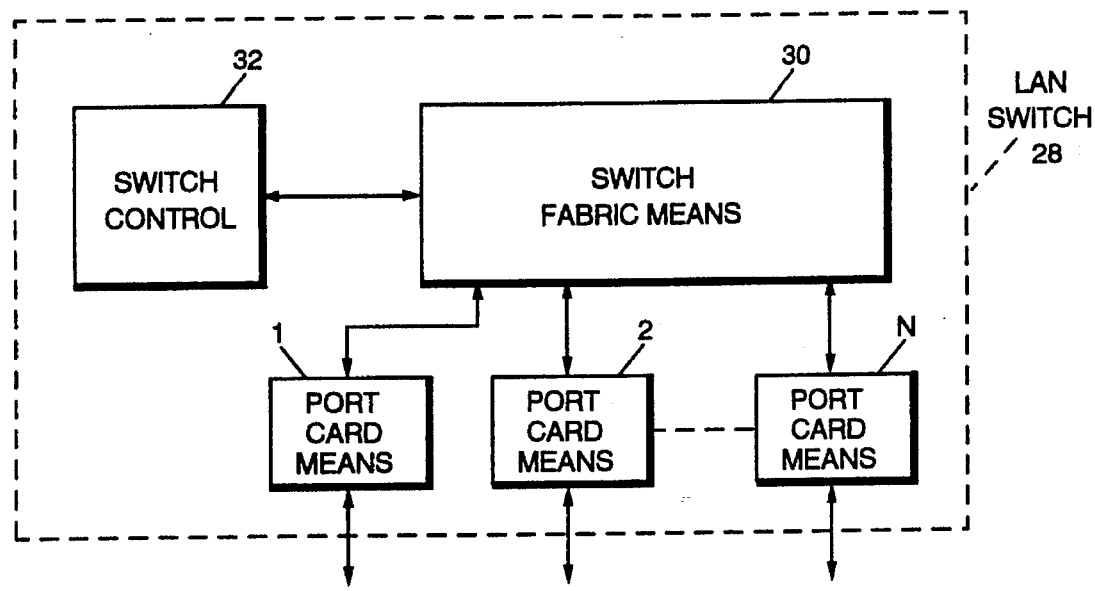
FIG. 2 shows a block diagram of a dedicated bandwidth concentrator.

FIG. 2 shows a block diagram of a dedicated bandwidth concentrator (hereinafter referred to as a LAN switch). The LAN switch is generic and can be used in the network to replace the dedicated bandwidth concentrators. The LAN switch is comprised of a housing 28 which supports and covers the components of the LAN switch. A switch fabric means 30 is mounted in the housing. The switch fabric means 30 could be a crossbar or TDM switch which provides simultaneous multiple paths between its input and its output. Such switch fabrics are well known in the prior art and further details of such a well known device will not be given. A switch controller (CTRL) 32 is coupled over bidirectional transmission media to the switch fabric means 30. The switch controller could be a microcomputer which provides broadcast functions and other management functions to the LAN switch. A plurality of port card means 1, 2 ... N are connected over individual bidirectional transmission media to the switch fabric means 30. Similarly, each of the port cards means are connected on their respective output side by individual transmission media to individual stations or LAN segments (not shown). Each of the port card means provides processing services to the devices or LAN segments which are connected through appropriate connectors (not shown) to the port card means. In an actual implementation, the connectors are mounted in the housing and their output are wired or otherwise coupled to the port card means.

Still referring to FIG. 2, the port card means are of three types—half-duplex port card means, full-duplex port card means, and one that supports both. In particular, in FIG. 2 port card means 1 and port card means 2 are half-duplex port card means while port card means N is a full-duplex port card means. As discussed previously, the half-duplex port card means operates in the 802.5 token ring mode wherein a token has to be circulating for the attached station or ring segment to operate. In the full-duplex port card means, token circulation is suspended. In other words, in full-duplex operation, communication between the port card means and the attached station does not require the use of a token. It should be noted in FIG. 2 even though three port cards means are shown with one being a full-duplex port card means and the others being half-duplex port card means, any mixture of this combination of half-duplex port card means and full-duplex port card means are permitted under this invention, and the showing in FIG. 2 is only illustrative and does not limit the scope of the invention.

Still referring to FIG. 2, the half-duplex port card means, such as port card means 1 and port card means 2, include a port microprocessor not shown, a token ring physical layer (PHY) function, a token ring MAC controller to perform the functions required by the 802.5 IEEE standard for token ring and buffering. The overall function of the port card means is to provide data to the output devices in accordance with the protocol used by the device and/or the LAN segment to which it is connected. Since all half-duplex port card means function in the same way, the description of one is intended to cover all. The full-duplex port card means N which is a key feature of the present invention is described subsequently. Suffice it to say at this point that the structure of the full-duplex port card means is such that it communicates with a full-duplex station in a full-duplex mode. In the full-duplex mode, the port card means transmits and receives data simultaneously. Similarly, the full-duplex station such as full-duplex station 14 (FIG. 1) transmits and receives data simultaneously.

Figure 3:
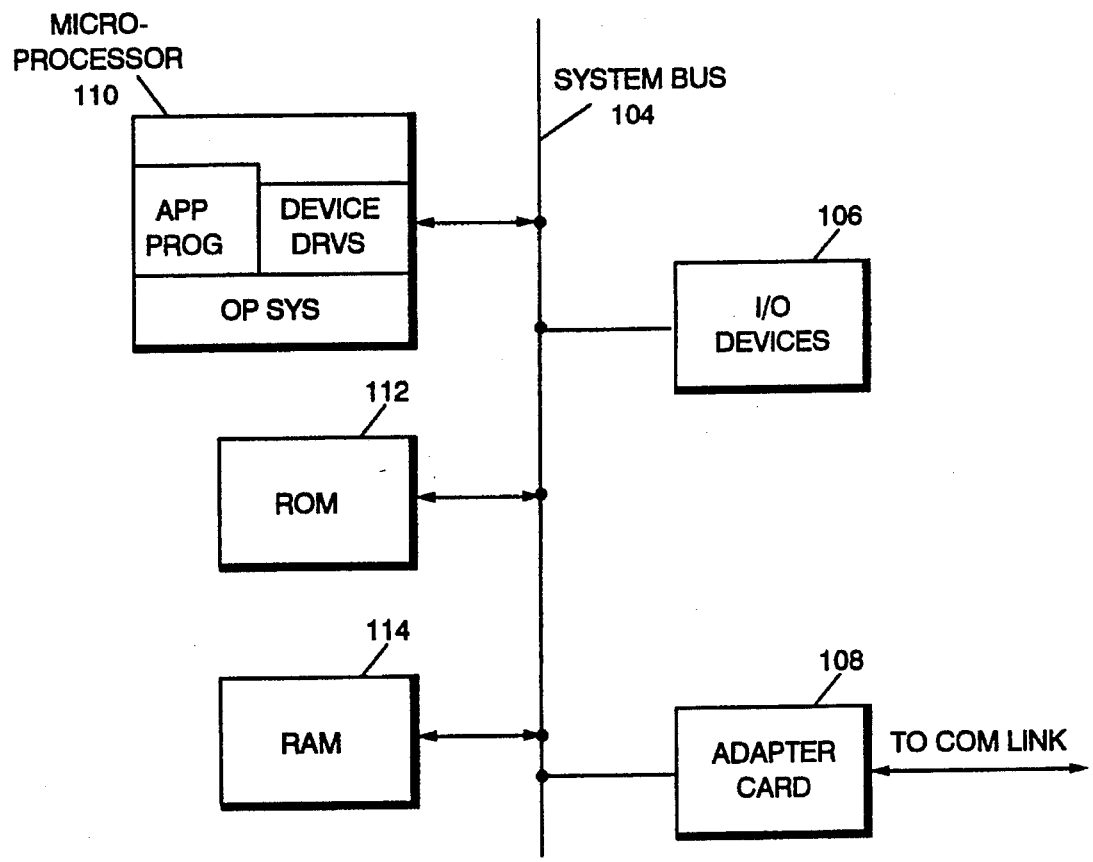
FIG. 3 shows a block diagram of a station.

Referring to FIG. 3, a functional block diagram of a typical station is shown. The station could be a file server, a personal computer, a workstation, etc. Functionally, the station includes a system bus to which I/O devices 106, adapter card 108, and microprocessor 110 are connected. ROM 112 and RAM 114 are connected to the system bus. The adapter card 108 interconnects the system bus to a communication link. Information into the microprocessor and out of the microprocessor to the communication link are transmitted through adapter card 108. The I/O devices 106 includes keyboards, scanners, display devices, mouse or the like. The microprocessor 112 includes an operating system on which device drivers and application programs are executed. The model described and shown in FIG. 3 is well known to those skilled in the art, therefore, additional detailed description of the components and operation will not be given. Suffice it to say at this point that the novel features of the invention (to be described hereinafter) are implemented in the adapter card and in the microprocessor 110.

Figure 4:
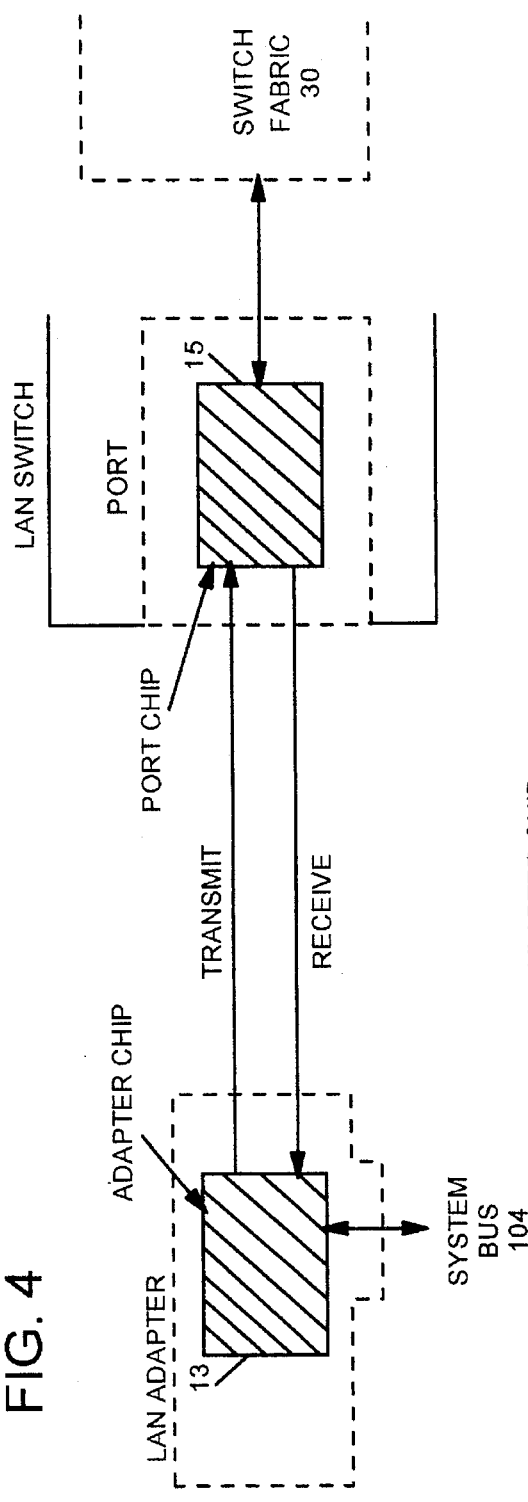
FIG. 4 shows a conceptual representation of a full-duplex link including duplex protocol generators in the station which provide the full-duplex feature in the station adapter and the switch port.

Turning to FIG. 1 for the moment, the full-duplex feature of the present invention includes full-duplex station 14 coupled by a cable infrastructure to port means 16E. In FIG. 2, port card means N is mounted inside of port means 16E and attaches over a transmission link to a full-duplex station. With reference to FIG. 4, the full-duplex feature includes a LAN adapter which is connected to the system bus 104 (example, a PCI bus) and a Transmit/Receive media pair interconnecting the adapter chip 13 in the LAN adapter to the port chip 15 in the port card means. The output from the port chip 15 is connected to the switch fabric 30. As will be explained subsequently, the adapter chip 13 performs a plurality of frame base handshaking between the port chip to determine if the port chip supports full-duplex operation.

Figure 5:
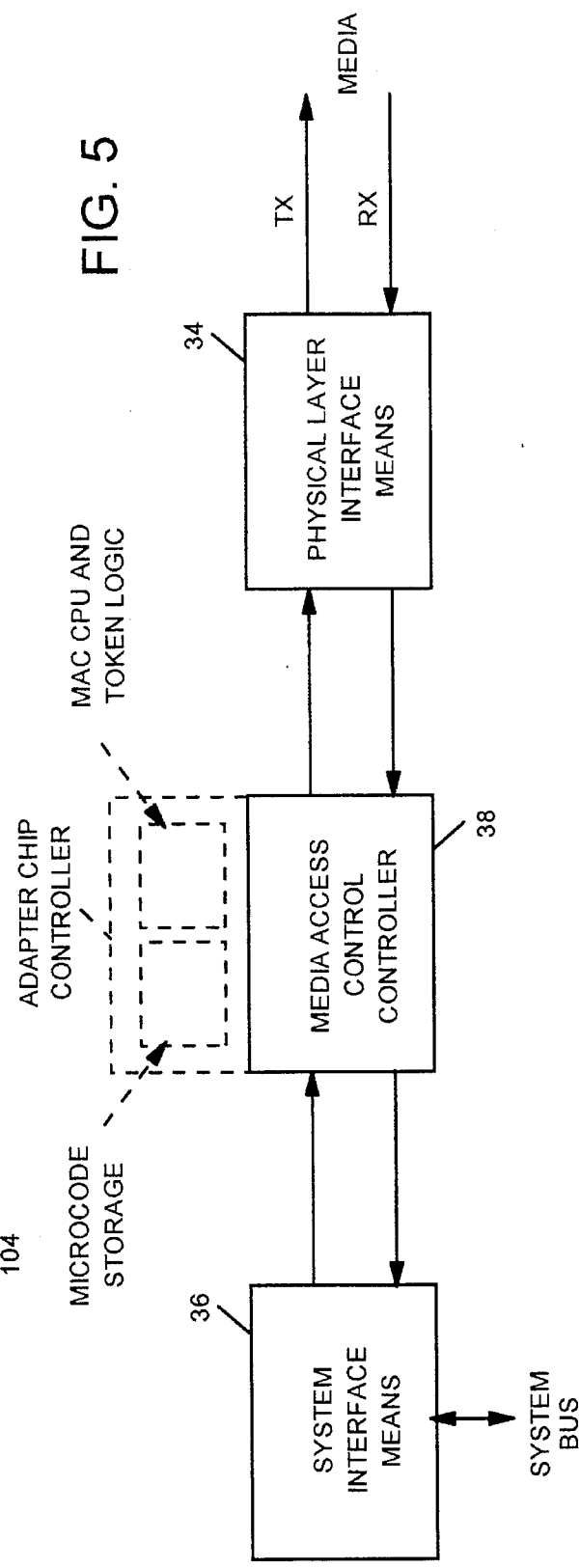
FIG. 5 shows a functional block diagram of the adapter full-duplex protocol generator.

FIG. 5 shows a block diagram of the adapter chip 13 shown in FIG. 4. The adapter chip 13 includes a physical layer interface means 34, a system interface means 36, a MAC controller 38 coupled over appropriate transmission media to the system interface means 36 and the physical layer interface means 34. A chip microcontroller comprised of a MAC CPU and token logic and a microcode storage, is coupled to the MAC controller 38. It should be noted for full-duplex operation the Token Logic would not be required. It should be noted that the microcontroller is optional and the functions performed by the microcontroller and described hereinafter could be performed by the processor in the system which the adapter attaches to the transmit/receive media of FIG. 4. Such an embodiment would result in a low cost full-duplex adapter.

Still referring to FIG. 5, the physical layer interface means 34 performs analog functions required by the chip. To this end, it performs the function necessary to transmit and receive signal from the media to which it is connected. To carry out these functions, the physical layer interface means include transceivers which transmit and receive signal phase lock loop for extracting clock data signal and similar device for performing analog functions. The MAC controller 38 performs the function set forth in the IEEE 802.5 standard for token ring to formulate a packet of data to be in conformity with a token ring frame. To this end, the MAC controller in processing a transmit frame adds a SD (starting delimiter), AC (access control), ED (end delimiter), FS (frame status) and computes the FCS (frame check sequence) value which is appended to all transmitted frames. Likewise, for receive frames the MAC controller detects the SD, decodes DA (destination address), checks the FCS and detects the end delimiter field in the frame. Optionally, the MAC CPU builds and checks MAC frames and can support token passing operation with the token logic in accordance with 802.5 standard for Token Ring. As will be explained subsequently, the flowchart describing the process which the MAC CPU and token logic or, system CPU, use for full-duplex handshaking purposes are described subsequently.

FIG. 6 shows a block diagram of the switch port chip 15 (FIG. 4). The switch port chip includes a physical layer interface means 40 coupled over appropriate transmission media to a MAC controller 42. The MAC controller 42 is coupled over appropriate transmission media to system interface means 44. A switch port controller, comprised of a MAC CPU and token logic and microcode storage, is coupled to the MAC controller 42. As with the adapter chip previously described, the switch port chip controller is optional in that its function could be provided by some other controller or microprocessor in the LAN switch. The physical layer interface means 40 couples a switch port chip to a receive (RX) and transmit (TX) media. To this end, it includes circuitry which performs analog functions including clock recovery from signals received from the media and condition signals for transmission on the media. The media access controller 42 performs the function to receive and transmit data in accordance with the protocol set forth in the 802.5 standards for token ring. Therefore, for transmit frames the MAC controller 42 adds SD, AC, ED, FS, and computes FCS. For receive frames, the media access controller 42 detects SD, decodes DA, checks FCS and detects ED. The MAC CPU in the switch port controller builds and check MAC frames and may support token passing operation with the token logic.

In order for the adapter chip 13 (FIG. 4) to determine if the switch port chip 15 supports the full-duplex or half-duplex modes of operation, a handshaking routine including the exchange of unique and new MAC frames is done between the switch port chip and the adapter chip. Before describing the flowcharts which show programs for implementing the handshaking routine, a description of the new MAC frames is given. The new MAC frames are Registration (REG) Request (REQ) MAC frame, Registration (REG) Response (RESP) MAC frame, Insertion (INS) Request (REQ) MAC frame and Insertion (INS) Response (RESP) MAC frame.

Figures 9A, 9B, 9C, 9D:
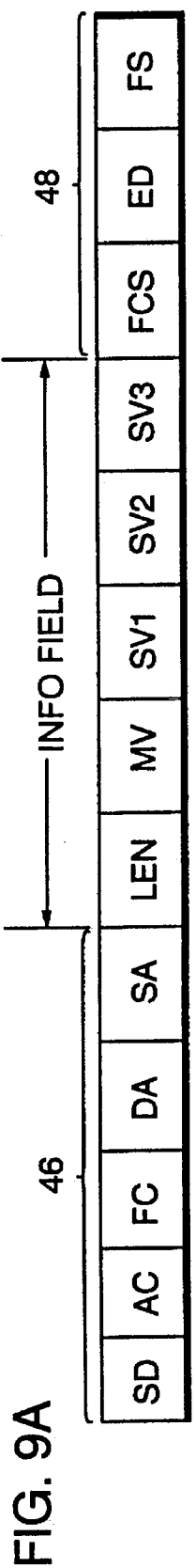
FIGS. 9A–9D show frame formats of the frames exchange between the station and the port to establish full-duplex operation.

The new abbreviations and interpretations for each of the new sub-fields are underlined below. Turning now to FIG. 9A, the frame format for the REG REQ MAC frame is shown. The frame includes the following fields:
SD Start Delimiter
AC Access Control
FC Frame Control (first two bits are 00 for MAC frame)
DA Destination Address
SA Source Address
LEN Length of LEN, MV and SV fields
MV Major Vector Registration Request (11hex)
SV1 Request type (OEh), 1=TKP, 2=TKI
SV2 Number of addresses supported (21hex), 1 for IBM adapters
SV3 Phantom drive (OChex). 0=none, 1=phantom, 3=wire fault checking
FCS Frame check sequence
ED End delimiter
FS Frame status The frame format conforms with the standard MAC frame format set forth by the 802.5 standard for token ring. The portions of the frame labeled N46 and 48 are standard token ring notations and sub-fields. Consequently these sub-fields will not be discussed further. The remaining portion of the frame are new and will be described. The frame includes a Major Vector (MV) sub-field which carries a value indicating the frame type. In the preferred embodiment of this invention, the MV value is 11 hex. A Sub-vector (SV1) field carries a Request type code. In the preferred embodiment of this invention the request type code is set to 0Ehex. In addition, a 1 setting in this sub-field indicates the station is requesting half-duplex service and a 2 indicates the station is requesting full-duplex service. In the IEEE 802.5 parlance, TXI represents full-duplex request. The Sub-vector SV2 sub-field carries a hex value indicating the number of addresses supported by the terminal. In the preferred embodiment of this invention, the SV2 vector is set to 21hex. The Sub-vector 3 (SV3) is the phantom drive sub-vector field. In the preferred embodiment of this invention, the sub-vector field is set to 0Chex. In the preferred embodiment of the invention, if the setting is 0, the station will not insert with phantom drive current. If the setting is a 1, the station will insert with phantom drive current and if the setting is a 3, the station will perform wire fault checking. It should be noted that the preferred value in these fields are optional and other values can be used without departing from the scope of the present invention. In addition, it should be noted that the SV2 and SV3 fields are not essential for registration and could be omitted in the above frame.

FIG. 9B shows the REG_RSP frame format. This frame format is generated at the switch port chip and returns to the adapter chip from which a REG REQ frame is received. The REG RSP frame format is consistent with the 802.5 standard for token ring MAC frames. The abbreviations and meaning for each abbreviation follows:
SD Start Delimiter
AC Access Control
FC Frame Control (first two bits are 00 for MAC frame)
DA Destination Address
SA Source Address
LEN Length of LEN, MV, and SV fields
MV Major Vector (Registration Response) (12hex)
SV Response code (0Fhex), 0=access denied, 1=TKP, 2,-TXI
FCS Frame check sequence
ED End delimiter
FS Frame status The fields in the frame which are standard token ring fields will not be described any further. Only the new fields which relate to full-duplex communication will be described. To this end, the new fields are LEN, MV, and SV1. The LEN field is the length field and gives the total number of bytes in the length field, MV field and SV1 field. The MV field is a Major Vector field which identifies the frame type. In the present invention, the Major Vector field is coded with 12hex. When an adapter chip 13 (FIG. 4) decodes 12hex, the adapter is made aware that the frame is in response to a request registration frame. The SV1 field carries a response code. In the preferred embodiment of this invention, the response code is set to 0Fhex. If a 0 is set in the field, it indicates that the full-duplex request access is denied. If a setting of 1 is in the field, this indicates the station may operate in a half-duplex mode, and if a 2 is in the field, it indicates that the station may operate in full-duplex mode. As stated before, these settings are optional and other values can be used to represent the response without deviating from the spirit or scope of the present invention. It should be noted that the handshake between the port chip in the switch port (FIG. 4) and the adapter chip in the device port (FIG. 4) is carried out to determine if transmit immediate TXI (Full Duplex) operation is possible. The handshake is frame based and occurs before any other MAC protocol (i.e., before phantom drive is asserted and does not require token). Two other frames are exchanged between the port chip and the adapter chip before the station is fully inserted (allowed to transmit and receive data from the switch port).

FIG. 9C shows one of the other frames called INS_REQ Frame. The format of the INS REQ frame is consistent with IEEE 802.5 MAC frame format for token ring. The field abbreviations and full interpretation are:
SD Start Delimiter
AC Access Control
FC Frame Control (first two bits are 00 for MAC frame)
DA Destination Address
SA Source Address
LEN Length of LEN, MV, and SV fields
MV Major Vector Insert Request (13hex)
FCS Frame check sequence
ED End delimiter
FS Frame status The new field in this message is the MV Major Vector field which indicates to the port chip that the station sending this frame wishes to insert in the network. In the preferred embodiment of the invention, the Major Vector MV is set to 13hex.

FIG. 9D shows the INS RSP frame which is returned in response to the INS_REQ frame. The abbreviations and interpretations for each abbreviation are:
SD Start Delimiter
AC Access Control
FC Frame Control (first two bits are 00 for MAC frame)
DA Destination Address
SA Source Address
LEN Length of LEN, MV, and SV fields
MV Major Vector Insert Response (14hex)
SV1 Response code (0Dhex), 0=access granted (e.g., no duplicate address detected)
FCS Frame check sequence
ED End delimiter
FS Frame status The Major Vector MV field indicates the type of frame and in the preferred embodiment of this invention, it is set to 14hex. The SV1 field carries a response code and in the preferred embodiment of this invention it is set to 0Dhex. In addition, when set to 0 the port chip finds no duplicate address for the station which sent the insertion request frame. It should be noted that when the INS_REQ frame is transmitted from the adapter chip of a station to the port chip of a switch port, a check of the source address is made by the switch, and if a duplicate address is found the station is not allowed to enter or communicate with the port. If no duplicate address is found in the LAN switch, the SV1 vector in the INS RSP frame format is set to a 0 and the station is allowed to insert into the port. The flowchart for the programs executed in the station and the port to enable the station to determine if the port allows full-duplex transmission will now be described.

Figure 7A:
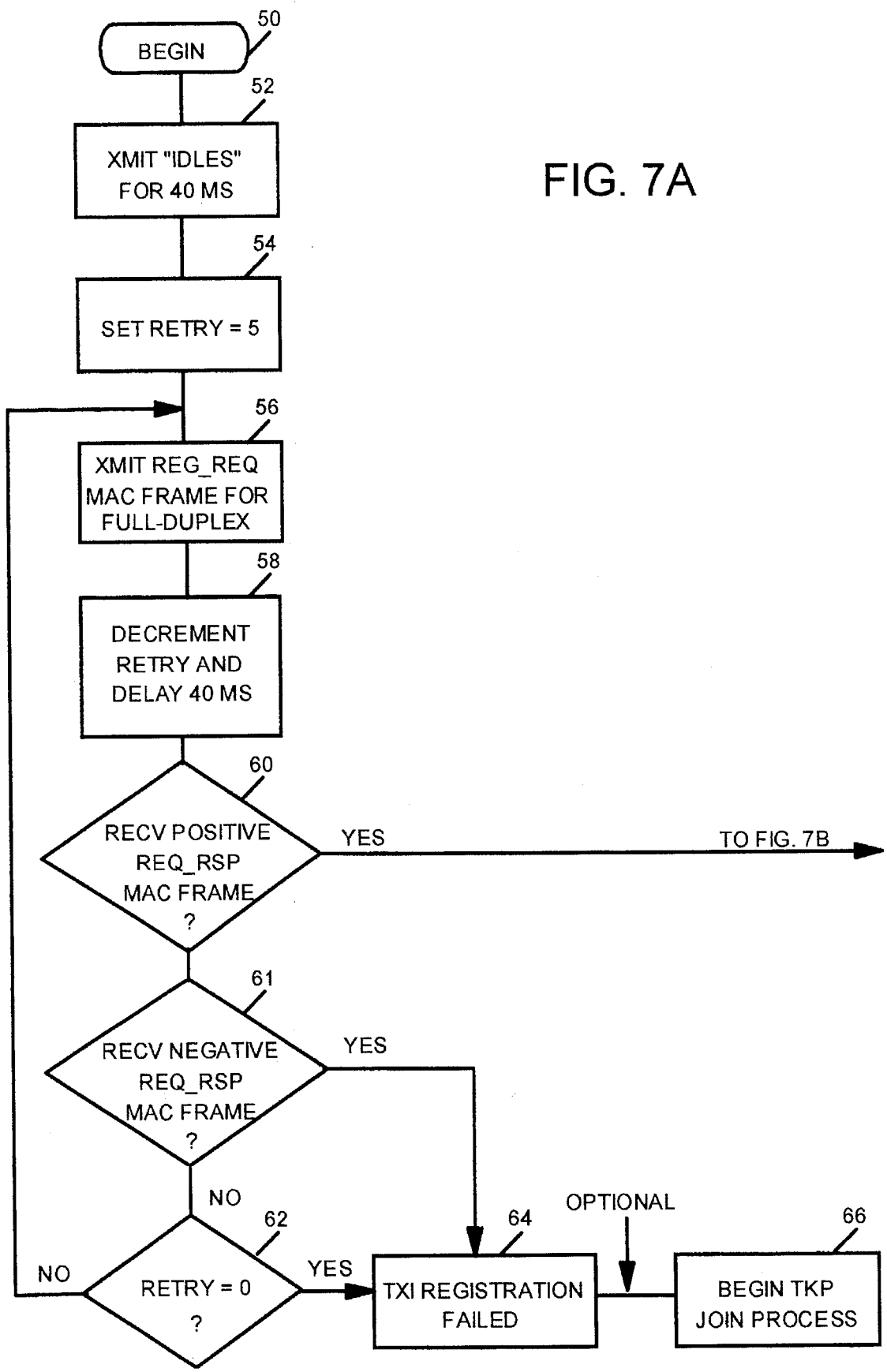
FIGS. 7A and 7B show a flowchart of the full-duplex protocol as exercised in the station.

FIG. 7A shows a flowchart of a program which is executed in the station wishing to join the network as a full-duplex station. The program begins in block 50 and descends into block 52. In block 52 idle signals are transmitted every 40 milliseconds on the link interconnecting the station to the switch port. The program then descends into block 54 where it sets a retry counter to a value such as 5. The program then descends into block 56 where it transmits the registration request MAC frame to the switch port. The program then descends into block 58 where it decrements the retry counter and delay 40 milliseconds and descends into decisional block 60. In decisional block 60 the program tests if a receive positive request response MAC frame has been received. If the answer is no, the program enters decisional block 61 where it tests if a negative REQ_RSP MAC frame is received. If the answer is no, the program descends into decisional block 62 where it tests the retry counter for a value of 0. If the value is not zero, the program loops to block 56 where the previously enunciated steps are performed. If the answer is yes (block 61), the program descends into block 64 where it flags indicating attempt to join the network in full-duplex mode fails.

Still referring to block 62, if the retry value is 0, the program enters block 64 and flags that the attempt to enter in full-duplex (TXI) mode registration failed. If the station has half-duplex (TKP) capability, it attempts to join the network as a half-duplex station, Block 66.

Figure 7B:
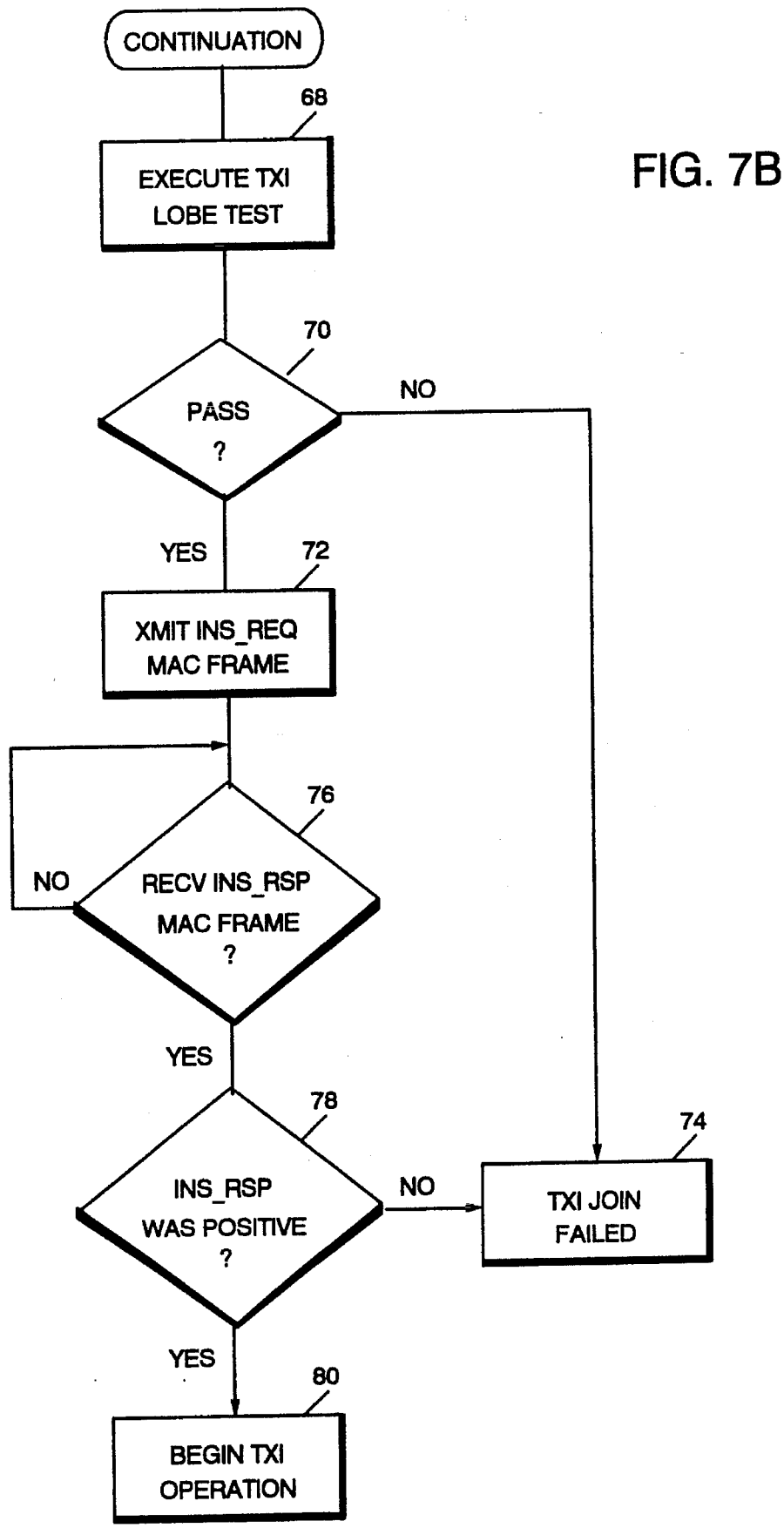

Referring to block 60, if the request response MAC frame is received with a positive value, the program descends to block 68, FIG. 7B. In block 68 the station executes a TXI (full-duplex lobe test) and descends into decisional block 70. In decisional block 70 if the test is successful, the program descends into function block 72. If the test was unsuccessful, the program, from decisional block 70, descends into block 74. In block 74 the program flag indicating that the attempt to join the network as a duplex station failed.

Referring again to block 72 70, if the lobe test is successful, the program transmits the INS REQ MAC frame to the port. The program then descends into decisional block 76 where it waits to receive the INS RSP MAC frame. If the frame is not received, the program enters a loop. When the frame is received, the program descends into decisional block 78. In decisional block 78 the program checks the INS RSP MAC frame, and if it is positive the program descends into block 80 where it begins full-duplex operation. If in block 78 the INS RSP was negative, the program enters block 74 and flags that attempt to join the station as a duplex station fails.

Figure 8:
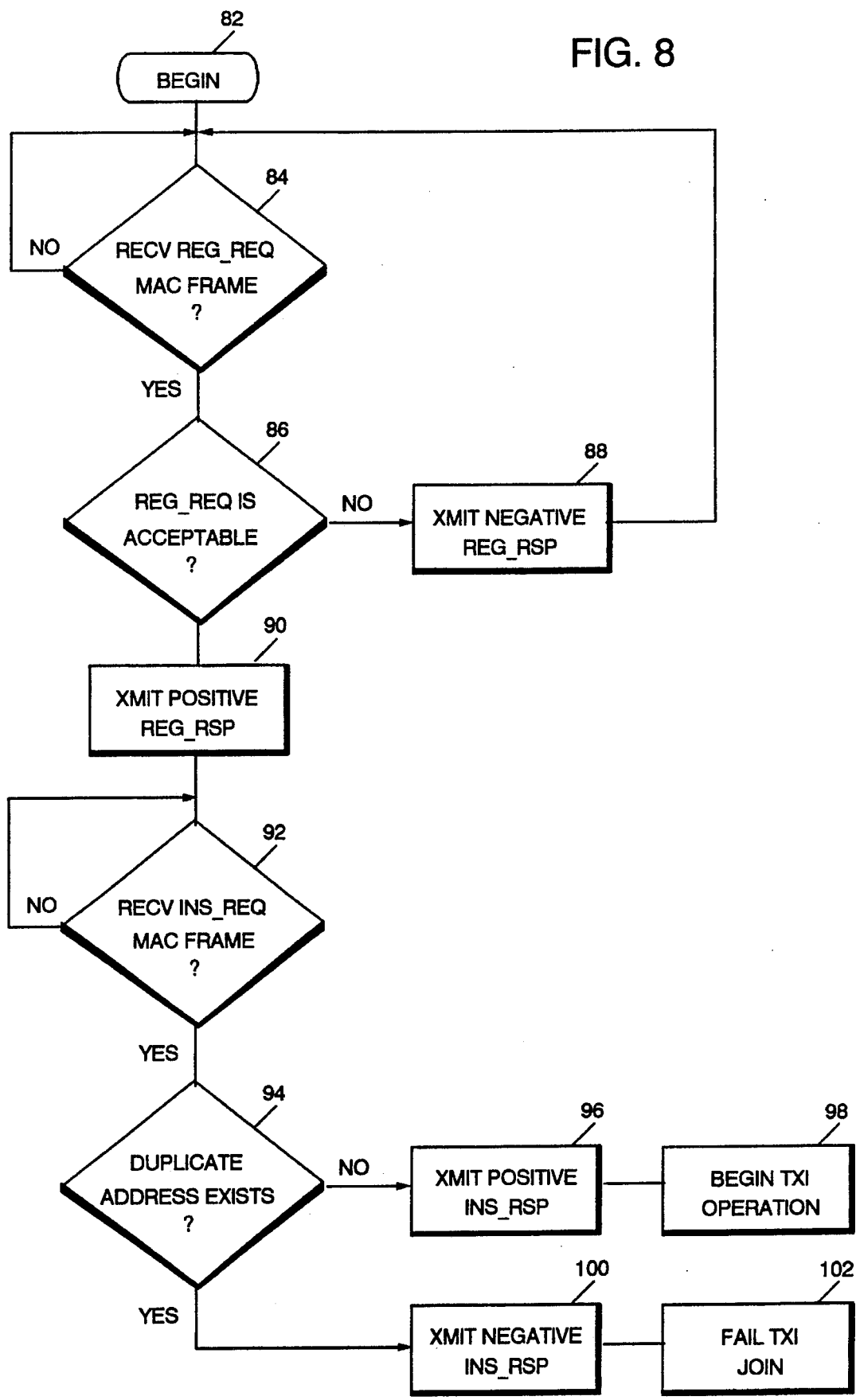
FIG. 8 is the flowchart of the full-duplex protocol which is executed in the port of the switch.

FIG. 8 shows a flowchart of the program which is executed in the switch port to notify the station if the port supports duplex operation. The process begins by entering block 82 and descending into decisional block 84. In decisional block 84 the program receives a REG REQ MAC frame. If it does not receive the frame, it loops until it receives one then it descends into block 86. In block 86 if the REG REQ MAC frame is not accepted, the program transmits a negative REG RSP MAC frame (block 88) to the sender and loops back to block 84.

If the REG REQ from the station is accepted (block 86), the program descends into block 90. In block 90 the program transmits a positive REG RSP to the requester and descends into decisional block 92. In block 92 the program receives the insert (INS) REQ MAC frame. It loops until the INS REQ MAC frame is received then the program descends into decisional block 94. In decisional block 94 a test is carried to ascertain if the address of the requestor is duplicated on the switch. If the address is not duplicated the program enters block 96 where it transmits a positive INS RSP to the requester and enters block 98 where the switch port begins full-duplex (TXI) operation. If in block 94 a duplicate address is found, the program descends into block 100 where it transmits a negative INS RSP to the requester and enters block 102. In block 102 the program flags that full-duplex transmission fails. This completes the description of the respective programs. A description of the handshaking routine between the full-duplex station and a switch port will now be given.

Figure 10:
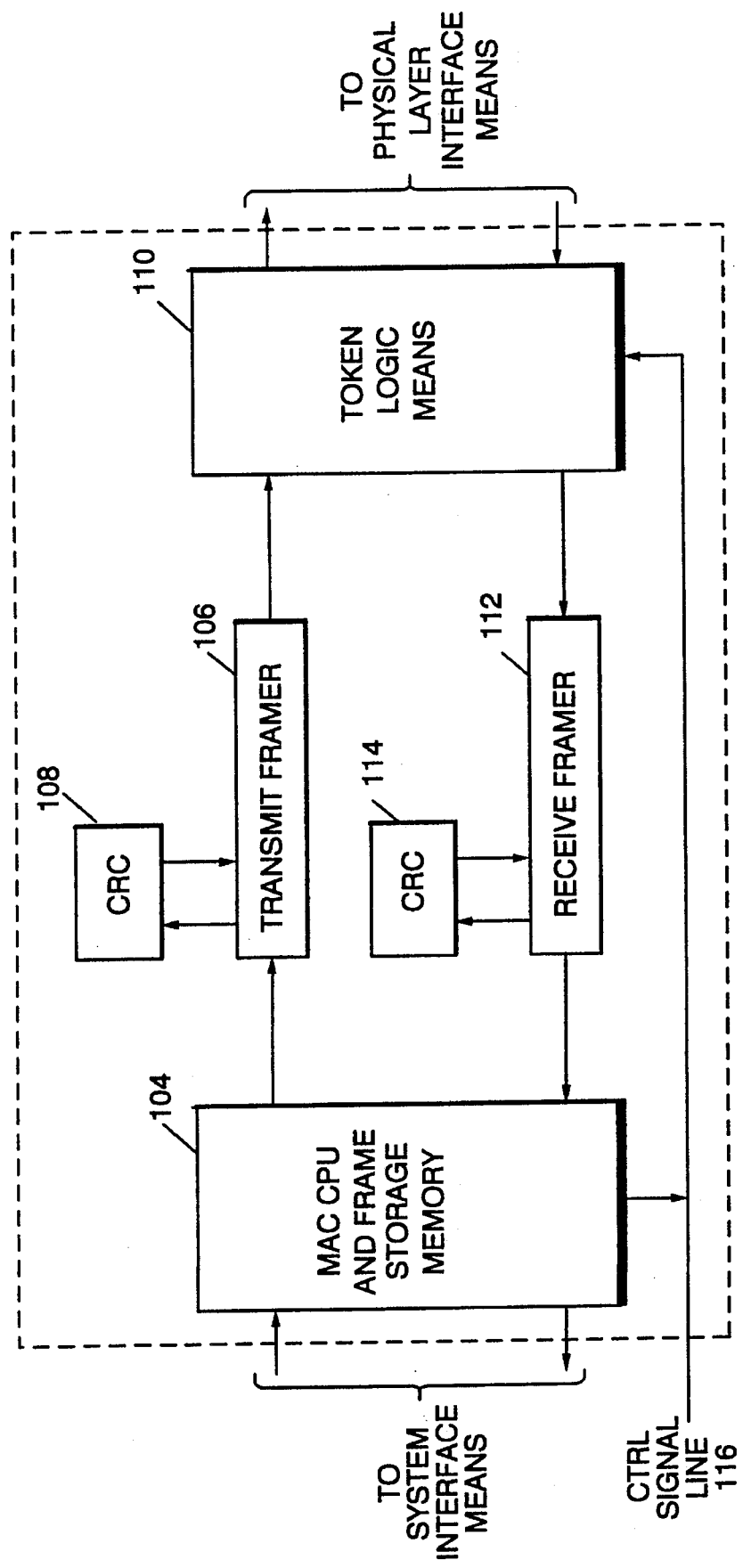
FIG. 10 shows a functional block diagram of the adapter controller.

FIG. 10 shows a functional block diagram of the adapter controller. With reference to FIG. 5 for the moment, the adapter controller interconnects the system interface means 36 with the physical layer interface means 34. The adapter controller is comprised of MAC CPU and frame storage memory means 104, transmit framer means 106, CRC 108, CRC 114, receive framer means 112, and token logic means 110. The control signal line 116 carries either a half-duplex control signal or a full-duplex control signal. The half-duplex control signal on control signal line 116 enables the half-duplex MAC functions in the CPU and enables the token logic in the token logic means 110. Likewise, if the control signal on control signal line 116 is the full-duplex signal, the token function capabilities of the adapter is inhibited and communications between the adapter and the switch port is full-duplex. The programs which would be executed on the MAC CPU has already been described and will not be repeated here.

In operation, a station wishing to communicate in full-duplex mode with the switch port to which it is connected generates and transmits a REG REQ MAC frame to the port. The REG REQ MAC frame includes a Major Vector field carrying a code indicating the type of frame, a Sub-vector 1 field carrying a code indicating whether the station is requesting entry as a full-duplex station or a half-duplex station, a Sub-vector 2 sub-field carrying a value indicating the number of addresses supported by the terminal, and a Sub-vector 3 field carrying phantom drive information. The phantom drive information is well documented in the literature including 802.5 standard for Token Ring and will not be described here. The switch port on receiving the REG REQ MAC frame generates a REG RSP MAC frame in response to the received frame. The REG RSP MAC frame includes a sub-vector field carrying a code indicating if the access is denied or full-duplex operation is granted or half-duplex operation is granted. The requesting station on receiving the REQ_REP either deactivates itself due to a negative REG_RSP or if a positive response is received, continues the process to operate in full-duplex or half-duplex mode generates and transmits an INS REQ MAC frame to the switch port. The INS REQ MAC frame includes a MV (Major Vector) which identifies the type of frame. The port then generates an INS RSP MAC frame including an SV1 field which carries a code indicating if set to one state that no duplicate address is attached to the switch or if set to another code indicates duplicate address is found and the station is prohibited from entering. If no duplicate address is found, the station enters the network and thereafter communicates as a full-duplex or half-duplex station.

Several benefits are made available to the user of this invention. Included in the benefits are:

1. Allows full-duplex operation in a mixed topology as shown in FIG. 1.
2. Allows for the implementation of low-cost full-duplex only stations.
3. Allows for the implementation of low-cost full-duplex only ports.
4. Allows implementation of multiprotocol ports to support new and old (i.e., old=half-duplex only) adapters.
5. Allows implementation of universal adapters that can connect to classic LANs (i.e., half-duplex LANs) or dedicated LANs and determine the optimal mode of operation (i.e., operate in full-duplex mode if possible).
6. Allows management control of stations requesting access to the network (i.e., can refuse access via a negative REQ_RSP MAC frame).
7. Automatic access protocol station reduces the knowledge of the LAN operation by the user.

It should be noted that in addition to switches, the present invention is intended to be used in other types of Data Transfer Units such as bridges or the like. In addition, the invention is also intended to be used in Port-to-Port. For example, in FIG. 1, the invention could be used in Port 22E and Port 16A.

Even though a specific embodiment of the invention has been disclosed and described, it should be understood by those having skill in the art that changes can be made to the specific disclosed embodiment without departing from the spirit and scope of the invention. This completes the detailed description of this invention.

What is claimed is:

1. A method for establishing and sustaining full-duplex mode of operation between a station and a port in a dedicated bandwidth concentrator to which the station is connected, said method comprising the steps of:

generating and transmitting to the port in the dedicated bandwidth concentrator a Registration Request Medium Access Control MAC frame having request sub-fields requesting permission to operate in the full-duplex mode of operation;

receiving in said station a Registration (REG) Response MAC frame with response sub-fields carrying predetermined frame type response codes;

examining the response sub-fields in the Registration Response MAC frame to determine settings of the predetermined frame type response codes;

if the predetermined frame type response codes are set to a first value indicating permission to operate in the full-duplex mode thereafter operating said station in the full-duplex mode, if the predetermined type response codes are set to a second value indicating permission denied deactivating said station if the station can only operate in the full-duplex mode.

2. The method of claim 1 further including the step of if the station can operate in a half-duplex (token) mode and the predetermined response frame type codes are set to a third value thereafter operating said station in the half-duplex (token) mode.

3. The method set forth in claim 1 or claim 2 further including the steps of generating and transmitting from said station to the port in the dedicated bandwidth concentrator an Insert (INS) Request (REQ) MAC frame including an insertion Major Vector MV sub-field requesting permission to insert into the port;

receiving in said station, an INS Response (RSP) MAC frame with an INS MV sub-field and a Sub-vector SV1 field; and examining the INS MV and SV1 sub-fields and if the INS Sub-vector SV1 sub-field is set to a predetermined value, inserting the station into said network.

4. The method set forth in claim 3 further including the steps of receiving in said port of said dedicated bandwidth concentrator the Insert Request MAC Frame;

analyzing the Insert Request MAC Frame;

generating and forwarding, to said station, the Insert Response MAC Frame.

5. The method of claim 1 wherein the REG REQ MAC frame includes a Major Vector MV sub-field for identifying frame type, a first Sub-vector SV1 sub-field for identifying request type, a second Sub-vector SV2 sub-field for identifying number of addresses supported, a third Sub-vector SV3 sub-field for identifying electrical state in which the station inserts into the port and a length (LEN) field for indicating the length of all sub-vector fields.

6. The method of claim 1 wherein the REG Response MAC frame includes a Major Vector MV sub-field for identifying the frame type and Sub-vector SV1 sub-field for carrying response codes.

7. The method of claim 6 wherein if the Sub-vector SV1 is set to 0hex, access for the station to enter in full-duplex mode is denied; if the Sub-vector SV1 is set to 1hex, the station is allowed to operate in full-duplex mode, and if Sub-vector SV1 is set to 2hex, the station is allowed to operate in half-duplex (token) mode.

8. The method of claim 1 further including the steps of receiving in the port of the dedicated bandwidth concentrator the Registration Request Medium Access Control MAC Frame;

analyzing said Registration Request Medium Access Control MAC Frame and generating and forwarding to said station, the Registration Response MAC Frame.

9. A method for establishing and sustaining a mode of operation between a station and a port in a dedicated bandwidth concentrator to which the station is connected, said method comprising the steps of:

generating and transmitting to the port in the dedicated bandwidth concentrator a Registration Request Medium Access Control frame having request sub-fields requesting permission to operate in a selected mode of operation;

receiving in said station a Registration (REG) Response frame with response sub-fields carrying predetermined frame type response codes;

examining the response sub-fields in the Registration Response frame to determine settings of the predetermined frame type response codes;

if the predetermined frame type response codes are set to a first value indicating permission to operate in the selected mode thereafter operating said station in the selected mode, if the predetermined type response codes are set to a second value indicating permission denied deactivating said station if the station can only operate in the selected mode.

10. The method of claim 9 wherein the selected mode includes full-duplex.

11. The method of claim 9 wherein the selected mode includes half-duplex.

12. The method of claim 9 wherein the Registration Request Medium Access Control REG REQ MAC frame includes a Major Vector MV sub-field carrying a code indicating frame type, a first Sub-vector SV1 sub-field carrying one of a plurality of codes representing a request type, a second Sub-vector SV2 sub-field carrying a code representing number of addresses supported, a third Sub-vector SV3 sub-field carrying a code representing phantom drive current capabilities and a Length LEN sub-field carrying a value indicating number of bites in the LEN, MV, SV1, SV2 and SV3 sub-fields.

13. The method of claim 9 wherein the Registration Response (REG RSP) frame is a MAC frame.

14. The method set forth in claims 5 or 12 wherein the Registration Request MAC Frame includes a set (some) of the sub-fields.

15. A station for connecting to a port of a LAN switch comprising:

a first means in said station for generating a Registration Request Medium Access Control MAC frame having request sub-fields requesting permission to operate in a full-duplex mode;

a second means coupled to the first means for transmitting the Registration Request MAC frame to the port;

a third means for receiving a Registration Response MAC frame having response sub-fields containing predetermined frame type response codes; and a fourth means coupled to the third means for analyzing the predetermined frame type response codes and generating a first control signal if said predetermined frame type response codes are set to a first value indicating permission to operate in full-duplex mode is granted, a second control signal if said predetermined frame type response codes are set to a second value indicating permission denied and a third control signal if said predetermined frame type response codes are set to a third value indicating permission to operate in a half-duplex (token) mode; and a fifth means responsive to each of the control signals to set said station in the permitted operational mode.

16. A station for connecting to the port of a LAN switch comprising:

a first means in said station for generating a Registration Request Medium Access Control MAC frame having request sub-fields requesting permission to operate in a particular mode;

a second means coupled to the first means for transmitting the Registration Request MAC frame to the port;

a third means for receiving a Registration Response MAC frame having response sub-fields containing predetermined frame type response codes;

a fourth means coupled to the third means for analyzing the predetermined frame type response codes and generating a first control signal if said predetermined frame type response codes are set to a first value indicating permission to operate in the particular mode, a second control signal if said predetermined frame type response codes are set to a second value indicating permission denied; and a fifth means responsive to each of the control signals to set said station in the permitted operational mode.

17. The station of claim 16 further including said fourth means generating a third control signal if said predetermined frame type response codes are set to a third value indicating permission to operate in an alternate mode.

18. The device of claim 16 wherein the particular mode includes full-duplex.

19. The device of claim 16 wherein the particular mode includes half-duplex.

20. An improved Local Area Network LAN comprising:

a mixed network, of at least one full-duplex station;

at least one LAN segment of half-duplex (token) stations; and means for coupling the at least one full-duplex station to said at least one LAN segment;

said means including a LAN switch having a housing, a switching fabric means for routing data packets positioned in said housing, a switch control means for performing broadcast functions and other management functions coupled to the switch fabric means, at least one half-duplex port card means for performing half-duplex functions including 802.5 Token Ring protocols coupled to the switch fabric means, and at least one full-duplex port card means coupled to the switching fabric means said at least one full-duplex port card means including functions, if activated, causing exchange of predetermined frames between said full-duplex card means and said full-duplex station connected to said full-duplex port card means to determine if full-duplex station can operate in a requested mode.

21. The improved LAN of claim 20 wherein the requested mode includes full-duplex.

22. The improved LAN of claim 20 wherein the requested mode includes half-duplex.

23. The LAN of claim 20 wherein the at least full-duplex station and the half-duplex stations are being operated at different speeds.

24. A LAN switch for using in a mixed LAN, said LAN switch comprising:

a housing at least one first port means located in the housing for connecting to at least one half-duplex station;

at least one second port means located in the housing for coupling to at least one other station; and a switching fabric means for routing data packets positioned in said housing, a switch control means for performing broadcast function and other management functions coupled to the switch fabric means, at least one half-duplex port card means for performing half-duplex function including 802.5 Token Ring protocol coupled to the at least one first port means, and at least one full-duplex port card means coupled to the switching fabric and the at least one second port means said at least one full-duplex port card means including functions, if activated, causing exchange of predetermined MAC frames with the at least one other station to inform said at least one other station if the at least one full-duplex port card means can communicate in a particular mode of operation.

25. The LAN switch of claim 24 wherein the at least one other station includes a full-duplex station coupled to the full-duplex port card means.

26. The LAN switch of claim 25 where in the full-duplex station includes a microprocessor having a system bus, a ROM coupled to the bus, a RAM coupled to the bus and an adapter card coupled to the bus; said adapter card having a system interface means for connecting to the system bus and passing data to and from said system bus, a physical layer interface means for processing, transmitting and receiving signals from transmission media; a Medium Access Control MAC Controller means coupled to the system interface means and the physical layer interface means, said MAC Controller means processing transmit data packets and receive data packets formed in accordance with 802.5 Token Ring standard, and control means for generating the predetermined MAC frames which are exchanged with a switch port to which the adapter is connected to select a mode of operation.

27. The LAN switch of claim 26 wherein the control means includes a programmed microprocessor; and logic means coupled to the microprocessor for frame forwarding or address learning for ports or broadcast transmit capability.

28. The LAN switch of claim 24 wherein the particular mode of operation includes full-duplex.

29. A LAN adapter for coupling a full-duplex station to a port whose communications capabilities are unknown, said adaptor comprising:

a system interface means for connecting to the system bus of a computer in the full-duplex station and passing data to and from said system bus;

a physical layer interface means for processing, transmitting and receiving signals from transmission media;

a Medium Access Control MAC Controller means coupled to the system interface means and the physical layer interface means, said MAC controller means processing transmit data packets and receiver data packets in accordance with a predetermined protocol; and control means coupled to the MAC Controller means for generating predetermined frames which are exchanged with the port to which the adapter is connected to see if said port communicates in a particular mode.

30. The adapter of claim 29 wherein the predetermined protocol includes 802.5 token ring standard.

31. The adapter of claim 30 wherein the particular mode includes full-duplex.

32. The adapter of claim 30 wherein the particular mode includes half-duplex.

33. In a mixed LAN having half-duplex stations and full-duplex stations interconnected by at least one LAN switch, a method for determining if a switch port to which a full-duplex station is connected supports a particular mode of operation and to establish said particular mode of operation if the switch port does support the mode of operation comprising the steps of:

in the full-duplex station, generating and transmitting to the switch port a Registration Request MAC frame having Request sub-fields requesting permission to operate in the particular mode;

in said switch port, generating, in response to the Registration Request frame, a Registration Response frame having response sub-fields set to selected ones of a range of values corresponding to operational characteristics of the switch port;

transmitting the Registration Response frame to the full-duplex station;

receiving, in said full-duplex station, the Registration Response frame;

examining the state of the response sub-field and if bits in said response sub-field are set to a first value indicating permission to operate in the particular mode setting said full-duplex station to operate in said particular mode, if bits in said response sub-field are set to a second value indicating permission denied deactivating said full-duplex station if said full-duplex station can operate only in the particular mode.

34. The method of claim 33 further including the step of operating in an alternate mode if the full-duplex station has the alternate mode capabilities and bits in the response sub-field are set to a third value indicating permission is granted to run in said alternate mode.

35. The method of claim 33 or 34 further including the steps of:

generating in the full-duplex station an Insertion (INS) Request frame having a Major Vector (MV) indicating frame type;

transmitting said INS Request frame to the switch port;

receiving in said switch port, the INS Request Frame;

examining the MV to determine frame type; if the frame type is the INS Request Frame; and generating in said switch port and transmitting to said full-duplex station an INS Response frame having an MV field carrying an identification code and a Sub-vector SV field carrying a duplicate address code.

36. The method of claim 35 wherein all frames include MAC frames.

37. The method of claim 33 wherein frames are MAC frames.

38. The method of claims 33 or 37 wherein the particular mode includes half-duplex.

39. The method of claims 33 or 37 wherein the particular mode includes full-duplex.

40. In a LAN having a LAN switch interconnecting stations an apparatus for determining the mode in which a station can operate with a switch port to which the station is connected, said apparatus comprising:

first means in said station for generating a Registration Request (REG REQ) frame having at least a Major Vector MV sub-field for identifying frame type and a first Sub-vector SV1 sub-field for identifying request type;

second means in said station for receiving from said switch port a Registration Request (REG REQ) frame having a Major Vector MV sub-field for identifying frame type and a Sub-vector SV sub-field carrying a predetermined code responding to an operational request in the SV1 sub-field; and third means in said station for examining the MV sub-field in the REG RSP frame and enabling the station to operate in a mode permitted by the predetermined code.

41. The apparatus of claim 40 wherein the REG RSP frame and the REG REQ frame include MAC frame.

42. The apparatus of claim 40 wherein the REG REQ frame further includes a second Sub-vector SV2 sub-field for identifying number of addresses supported, a third Sub-vector SV3 sub-field for identifying electrical state in which the station inserts into the port and a length (LEN) field for indicating the length of all sub-vector fields.

* * * * *